United States Patent
Huang et al.

(10) Patent No.: US 9,203,875 B2
(45) Date of Patent: Dec. 1, 2015

(54) METHOD AND SYSTEM FOR MANAGING MEETING RESOURCES IN A NETWORK ENVIRONMENT

(71) Applicant: CISCO TECHNOLOGY, INC., San Jose, CA (US)

(72) Inventors: Haihua Huang, Suzhou (CN); Yong Qian, Suzhou (CN); Yaqing Zhang, Suzhou (CN); Kejun Xia, Suzhou (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 247 days.

(21) Appl. No.: 13/899,263

(22) Filed: May 21, 2013

(65) Prior Publication Data
US 2014/0351327 A1    Nov. 27, 2014

(51) Int. Cl.
*G06F 15/16* (2006.01)
*H04L 29/06* (2006.01)

(52) U.S. Cl.
CPC ........ *H04L 65/1069* (2013.01); *H04L 65/1089* (2013.01); *H04L 65/1093* (2013.01); *H04L 65/4038* (2013.01)

(58) Field of Classification Search
None
See application file for complete search history.

(56) References Cited

U.S. PATENT DOCUMENTS

| | | | |
|---|---|---|---|
| 8,250,141 B2 | 8/2012 | Xiao et al. | |
| 2008/0232277 A1* | 9/2008 | Foo et al. | 370/260 |
| 2011/0106963 A1* | 5/2011 | Lee et al. | 709/231 |
| 2011/0154219 A1* | 6/2011 | Khalatian | 715/751 |
| 2014/0003450 A1* | 1/2014 | Bentley et al. | 370/468 |
| 2014/0019536 A1 | 1/2014 | Christensen et al. | |

OTHER PUBLICATIONS

USPTO Jan. 30, 2015 Non-Final Office Action from U.S. Appl. No. 13/742,943.
U.S. Appl. No. 13/742,943, filed Jan. 16, 2013, entitled "System and Method for Managing a Conversation for a Meeting Session in a Network Environment," Inventors: Haihua Huang, et al.

* cited by examiner

*Primary Examiner* — Quang N Nguyen
*Assistant Examiner* — Padma Mundur
(74) *Attorney, Agent, or Firm* — Patent Capital Group

(57) ABSTRACT

In one example embodiment, a method is provided and includes monitoring a display status associated with a client device that is participating in a meeting being conducted over a network (wired, wireless, etc.). The method also includes reporting the display status to a server associated with the meeting. For example, the server could be responsible for controlling at least a portion of meeting resources for the client device (or the client device itself could include software to perform these management functions). The method also includes receiving reduced meeting resources based, at least in part, on the display status.

20 Claims, 6 Drawing Sheets

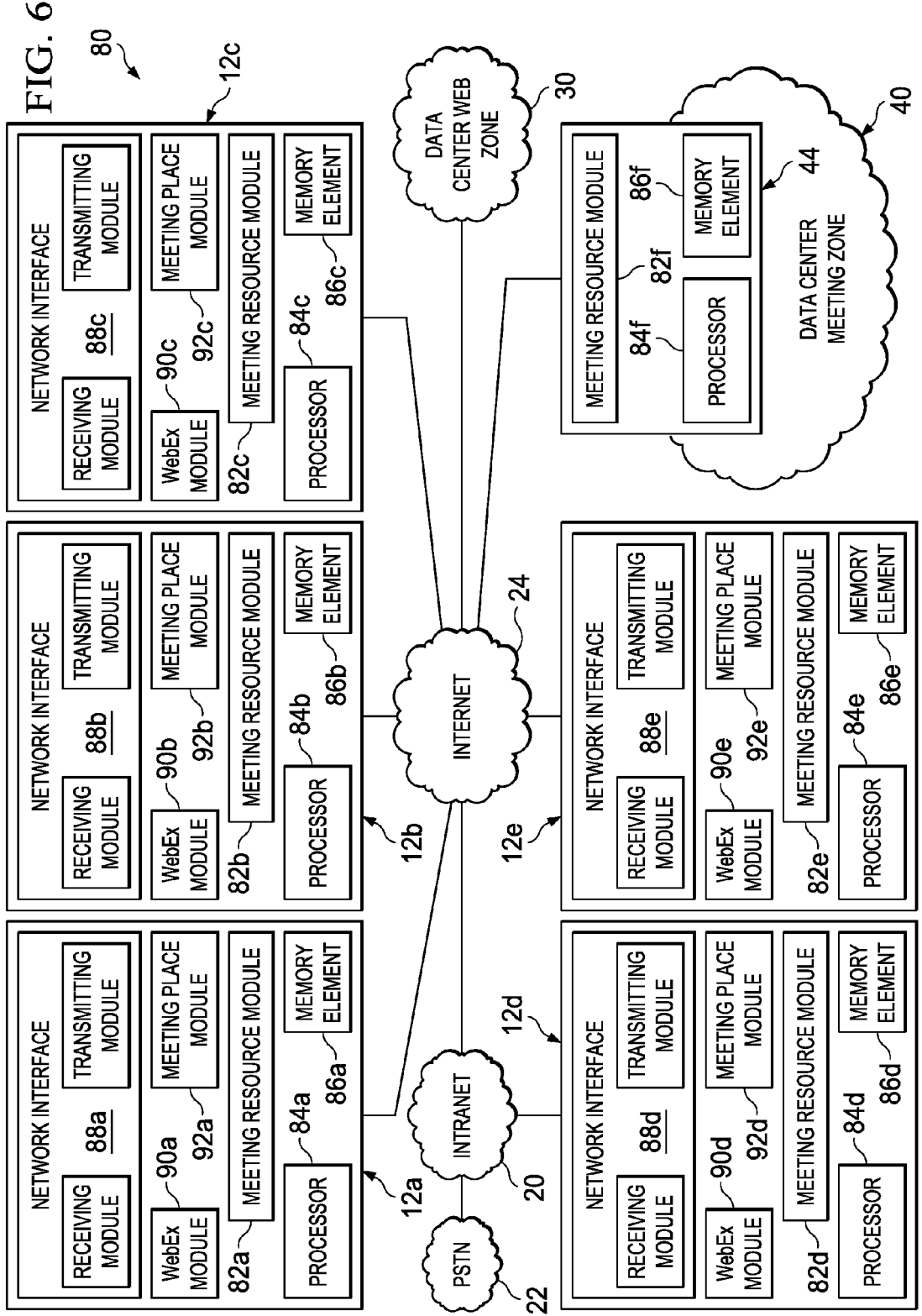

METHOD AND SYSTEM FOR MANAGING MEETING RESOURCES IN A NETWORK ENVIRONMENT

TECHNICAL FIELD

This disclosure relates in general to the field of communications and, more particularly, to managing meeting resources in a network environment.

BACKGROUND

Online meeting application software offers participants the opportunity to communicate and collaborate at reduced costs when compared to face-to-face meetings. During the meeting session, participants share and access resources that can include video, audio, or application files such as text documents, spreadsheets, and or visual presentations. Each resource can be transmitted over a common network and, further, can contribute to the reduced application performance at the participant's location. Meeting application software is generally not designed to optimize the performance of the participant's device, to accommodate bandwidth optimization, etc.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 is a simplified schematic diagram illustrating possible details related to an example infrastructure of the communication system in accordance with at least one example embodiment.

DETAILED DESCRIPTION OF EXAMPLE EMBODIMENTS

Overview

An example method is provided in one embodiment that includes monitoring (e.g., evaluating, pinging, overseeing, supervising, being aware of, observing, etc.) a display status associated with a client device that is participating in a meeting being conducted over a network (wired, wireless, etc.). The term 'display status' encompasses any state, condition, or characteristic associated with the display, the activity level of the user, the state of the software being run on the client device, the client device itself, or any other suitable parameter. The method also includes reporting (e.g., sending, transmitting, communicating, etc.) the display status to a server associated with the meeting. For example, the server could be responsible for controlling at least a portion of meeting resources for the client device (or the client device itself could include software to perform these management functions). The method also includes receiving reduced meeting resources based, at least in part, on the display status.

In more particular embodiments, if the display status is below a predetermined threshold, visual content is not provided to the client device. Additionally, the display status can be indicative of a meeting client program being at least partially visible from a perspective of a user of the client device, and where visual content corresponding to a visible portion of the meeting client program is received by the client device.

Note that the broad term 'meeting resources' can include any number of resources such as bandwidth allocation, video data, audio data, multimedia data, shared data (in the context of a call), prepopulated data, or any other suitable data that could feasibly propagate during a meeting. In certain examples, the method can include identifying a meeting client window being at least partially covered by another window, where the identifying triggers a reduction in the meeting resources for the client device. In addition, the method can further include identifying particular regions of a display screen of the client device, where the identifying triggers a reduction in the meeting resources for the client device.

In yet other example implementations, the method can include entering into an inactive mode in which a connection for the meeting is kept alive, where the client device would not receive video data and/or audio data while in the inactive mode. In certain instances, the method can include identifying inactivity by the client device in order to provide lower-frame-rate video to the client device. In alternative examples, any type of data (e.g., video data) can be progressively degraded based, at least in part, on the display status.

Example Embodiments

Figure 1:
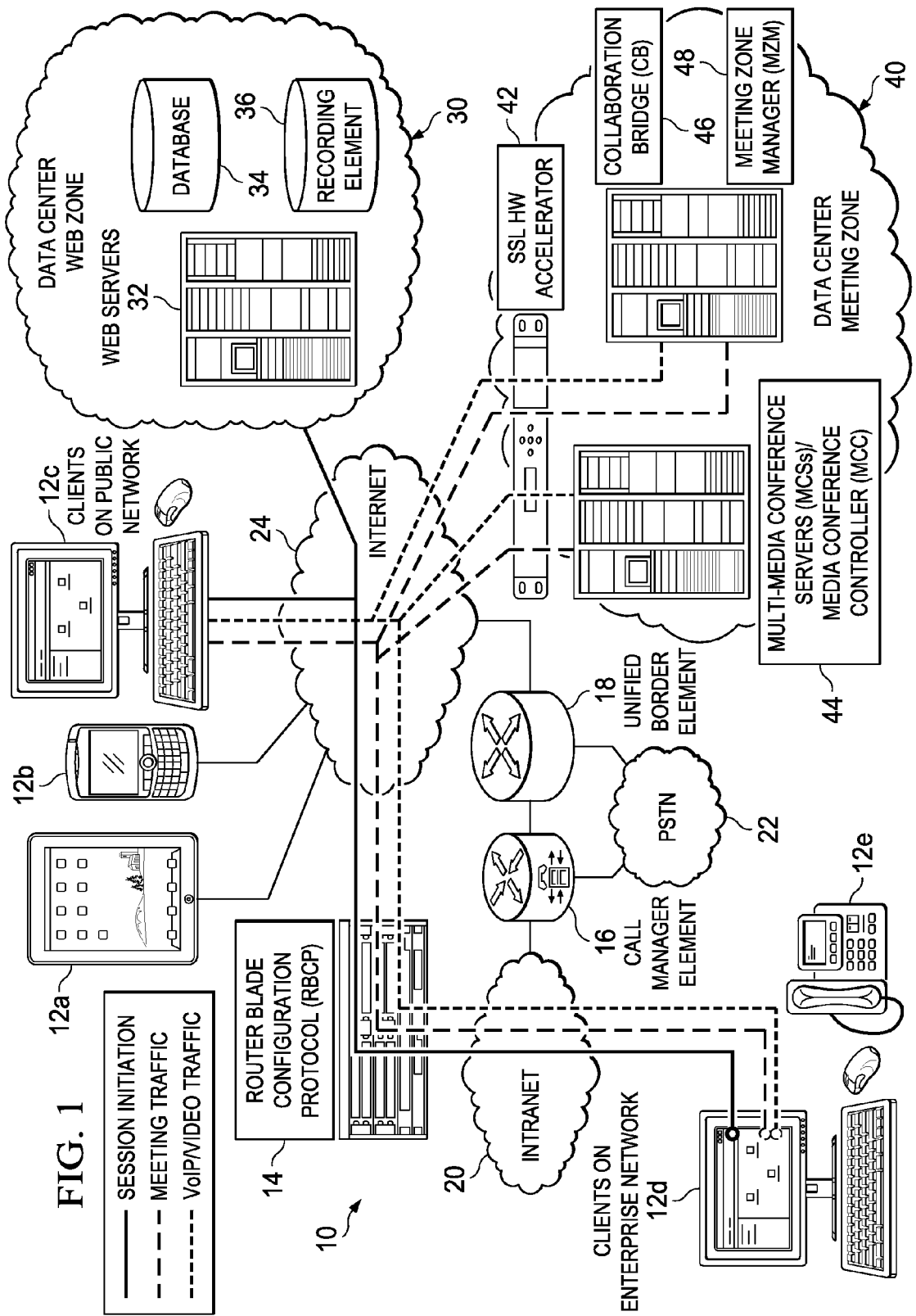
FIG. 1 is a simplified schematic diagram of a communication system for managing meeting resources in accordance with at least one example embodiment.

FIG. 1 is a simplified schematic diagram of a communication system 10 for managing resources in accordance with at least one example embodiment. Communication system 10 may include a number of endpoints 12a-e that may achieve suitable network connectivity via various points of attachment. In the example of FIG. 1, communication system 10 includes an Intranet 20, a public switched telephone network (PSTN) 22, and an Internet 24, which (in this particular example) offers a pathway to a data center web zone 30 and a data center meeting zone 40.

Data center web zone 30 includes a plurality of web servers 32, a database 34, and a recording element 36. Data center meeting zone 40 includes a secure sockets layer hardware (SSL HW) accelerator 42, a plurality of multimedia conference servers (MCSs)/media conference controller (MCC) 44, a collaboration bridge 46, and a meeting zone manager 48. In at least one example embodiment, each MCS may be configured to coordinate video and voice traffic for a given online meeting. Additionally, each MCC may be configured to manage the MCS from data center meeting zone 40.

Various types of routers and switches may be used to facilitate communications among any of the elements of FIG. 1. For example, a call manager element 16 and a unified border element 18 may be provisioned between PSTN 22 and Intranet 20. Also depicted in FIG. 1 are a number of pathways (e.g., shown as solid or broken lines) between the elements for propagating meeting traffic, session initiation, and voice over Internet protocol (VoIP)/video traffic.

In one embodiment, communication system 10 can provide a method to increase efficient bandwidth utilization in online meeting scenarios (e.g., WebEx™, Telepresence™, GoToMeeting™, Google Hangouts™, Skype™, etc.). In one example implementation, based on the attendee status, a server can simply send personalized data to the user that is reflective of what the user wants. More specifically, the architecture can divide meeting resources into several categories (video data, desktop share data, and audio data). In operation, the system can systematically monitor the attendee's status to identify which parts of the meeting resources are not of interest to the attendee. This information can be reported to a server, which can decrease that specific supply of information.

Note that in real-world applications, attendees are not required to concentrate on every aspect of an online meeting. As users disengage from a given meeting, an attendee may not fully quit a meeting, and such behavior becomes wasteful. Optimizing this bandwidth usage can reduce the pressure on the server, along with providing a better allocation of network resources.

Consider a first voice-only mode in which a server simply sends voice data to a client. During the meeting, in this particular example, the attendee is only interested in speech and, therefore, is indifferent to the video data, or to the documents being shared by a given presenter. The architecture of the present disclosure can detect these preferences by identifying the meeting client window being at least partially covered by another window. In other cases, the client can also detect the shown regions of the display screen. This information can be used to more intelligently deliver/prune resources for the client device.

In an inactive node, a server could simply keep a session alive and not provide any substantive data to client. This could include no content being provided to the client, while the session is still maintained. In a recovery mode, based on the current attendee's status, the system can be switched back and forth to the appropriate corresponding mode (e.g., automatically).

Note that in certain cases, inactivity can result in lower-frame-rate video being provided to the client. In addition, it should be noted that the present disclosure does not confine itself to a strict dichotomy between "full video stream" and "audio only." In contrast, a slow degradation can be provided between audio, video, multimedia, etc. Any of these variations are fully encompassed by the broad teachings of the present disclosure.

Figure 2:
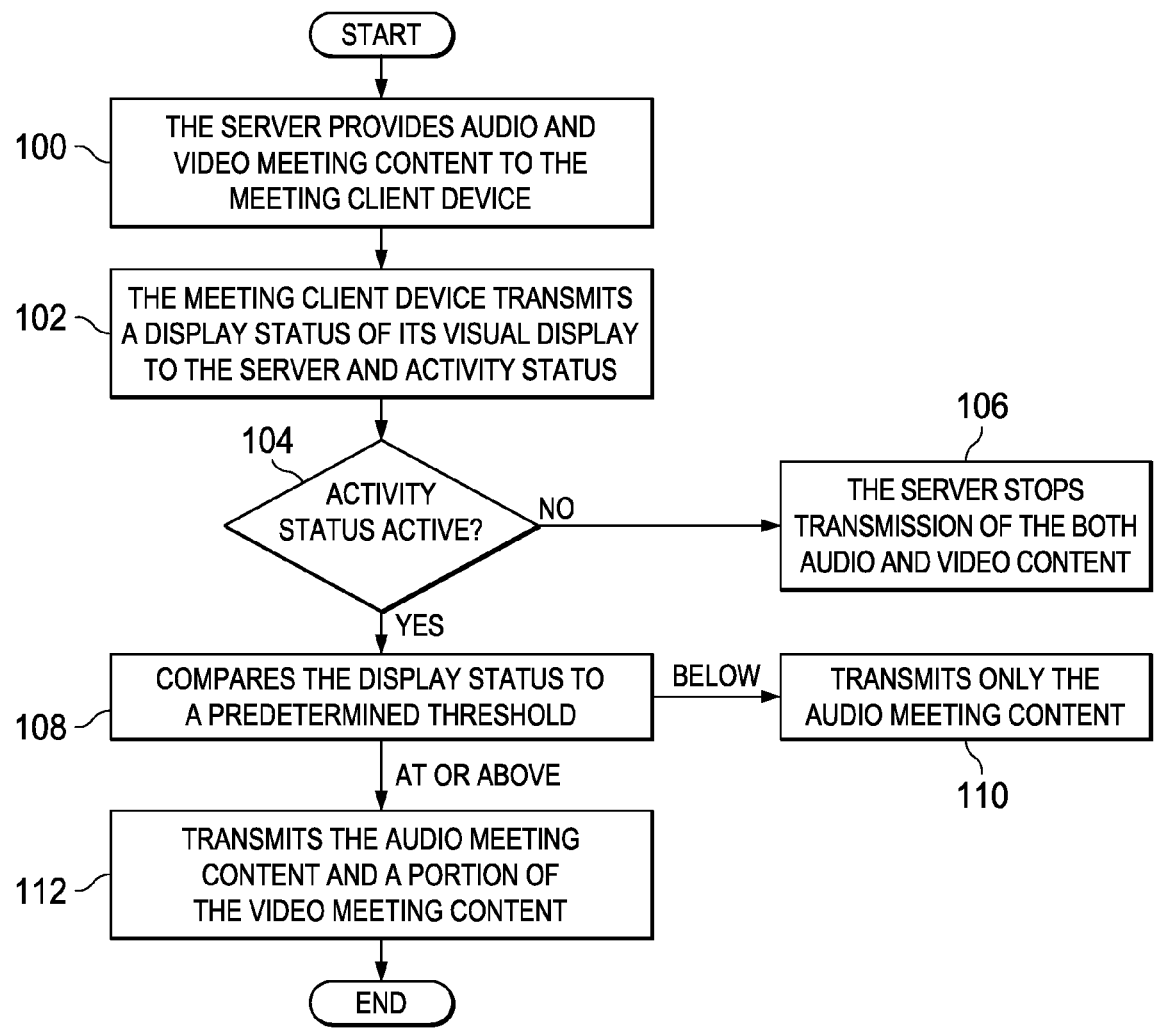
FIG. 2 is a flowchart illustrating example activities according to an embodiment of the invention.

FIG. 2 illustrates a flowchart according to an embodiment of the disclosure. The activities associated with the server referenced and FIG. 2 could be performed, for example, by MCSs/MCC 44, by a proprietary server, or by any other appropriate network element. In 100, the server provides audio and video meeting content to the meeting client device. The meeting client device can readily be enabled for online and/or network communications, if not already preconfigured for such communications.

In 102, the meeting client device transmits a display status of its visual display to the server, along with its activity status. In 104, the server determines if the activity status is inactive. In 106, if the activity status is inactive, the server stops transmission of the both audio and video content. In 108, if the activity status is active, the server compares the display status to a predetermined threshold. In 110, when the display status is below the predetermined threshold, the server transmits only the audio meeting content. In 112, when the status is above the predetermined threshold, the server continues to transmit the audio meeting content and a portion of the video meeting content. The portion can correspond to the percentage of visibly displayed meeting window.

In one embodiment, the activity status can determine when the display of the meeting client device has entered the screen saver mode, gone to sleep mode, hibernation, any power reduction, or the user has logged out, disconnected from a connection (e.g., a VPN connection), or the device has become locked. For example, when the meeting client device includes a camera, the user can be actively monitored for facial information, physical presence, eye-gaze, eye movement, proximity, etc. Additionally, the user can be monitored based on the user's interactions with the meeting client device, based on proximity information, based on global positioning system (GPS), based on presence data, or based on any other suitable data indicative of user activity. The display status may provide a condition related to the entire meeting session window, or a condition related to the active video transmission portion of the meeting session window.

Figure 3A:
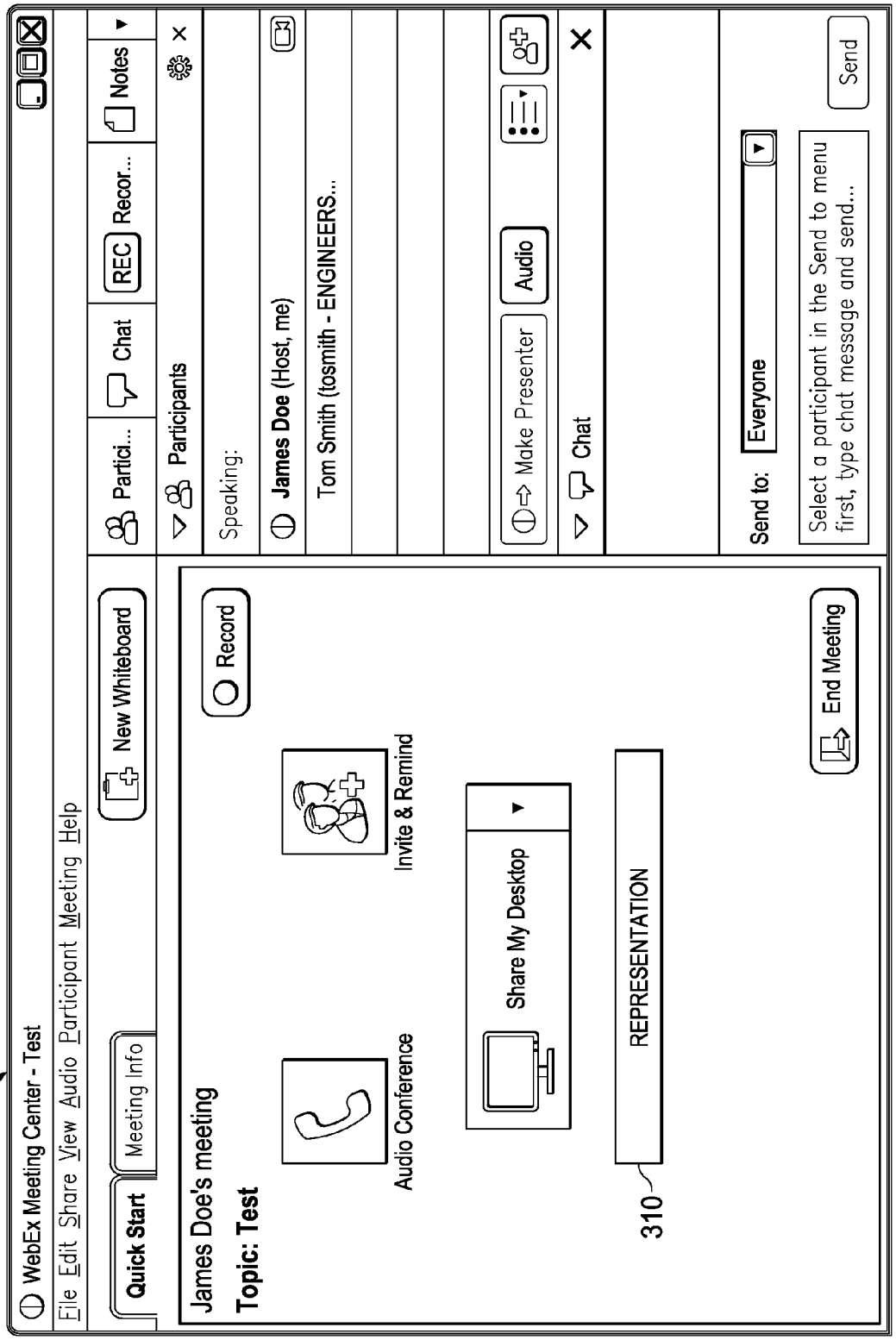
FIG. 3A is an illustration showing example user interface representations associated with a meeting client program according to at least one example embodiment.
Figure 3B:
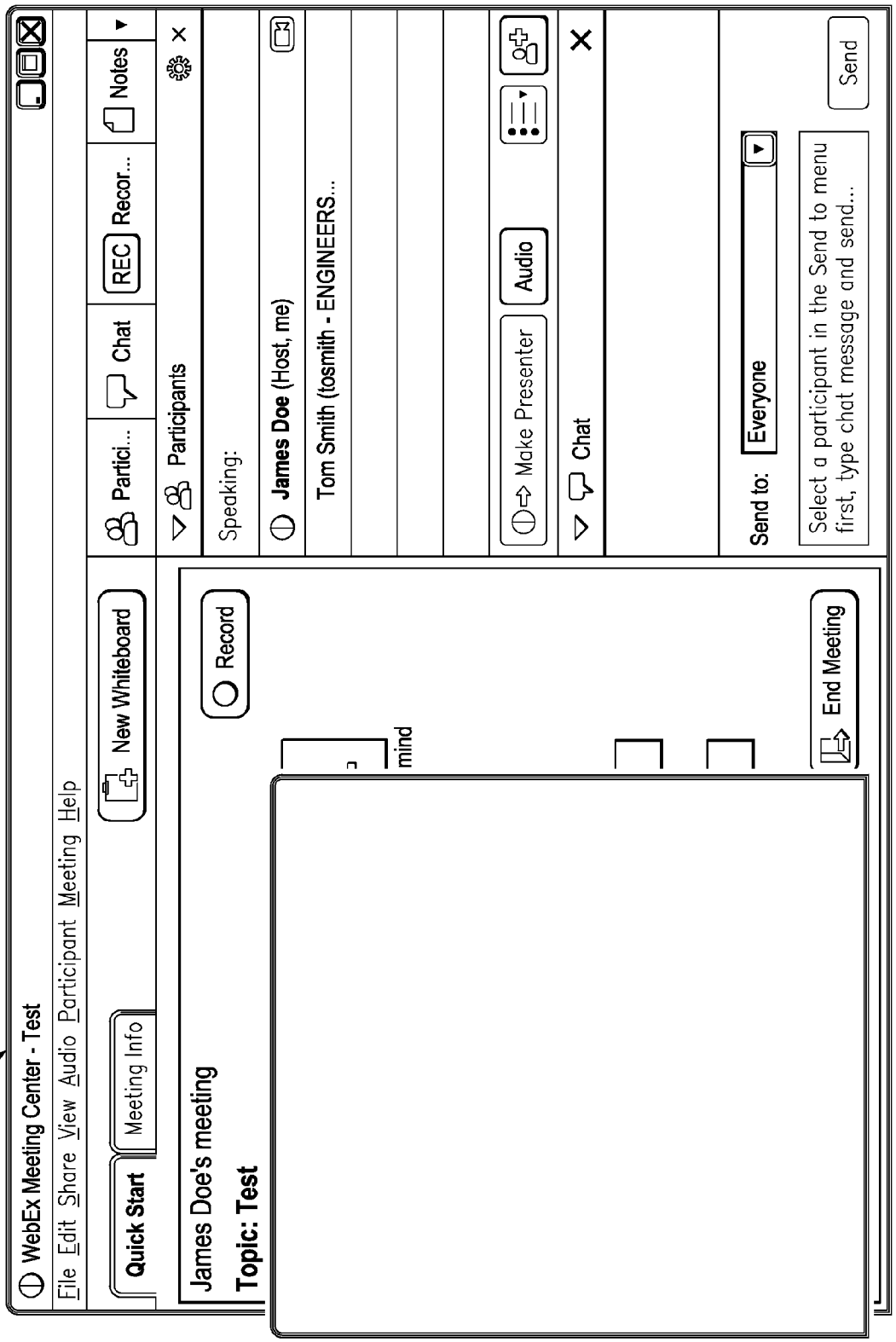
FIG. 3B is an illustration showing example user interface representations where the meeting session window is partially obscured.

FIG. 3A is a screenshot 300 illustrating example user interface representations associated with a meeting client program according to at least one example embodiment. In this particular example, a representation 310 is being provided for this particular meeting. FIG. 3B is a screenshot 350 illustrating user interface representations, where the meeting session window is partially obscured. This information could be used, for example, in order to provide some feedback as to the activity levels associated with a particular user.

Figure 4:
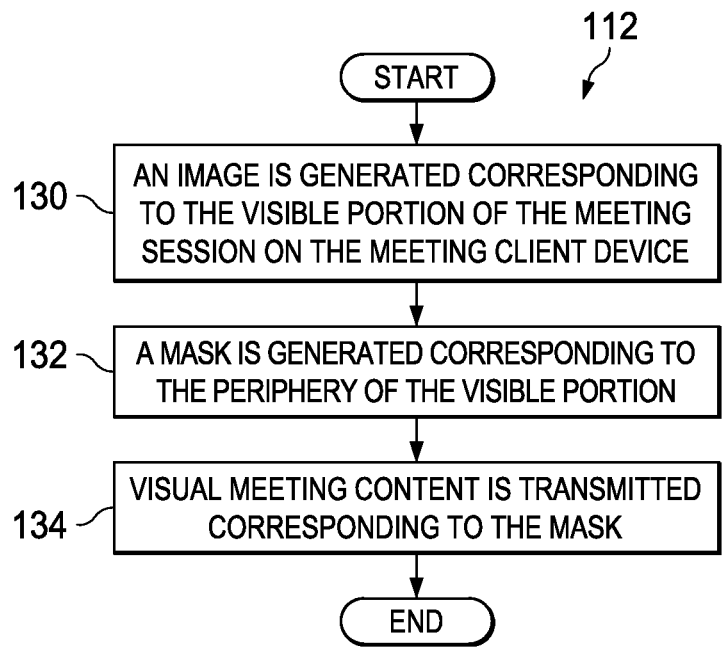
FIG. 4 is a flowchart illustrating additional details associated with an operation provided in FIG. 2.

Turning to FIG. 4, FIG. 4 is a flowchart illustrating additional details associated with operation 112 provided in FIG. 2. In 130, an image is generated corresponding to the visible portion of the meeting session on the meeting client device. In 132, a mask is generated corresponding to the periphery of the visible portion. This may be done, for example, by the meeting client server or by the meeting client device. In 134, visual meeting content is transmitted corresponding to the mask.

Figure 5:
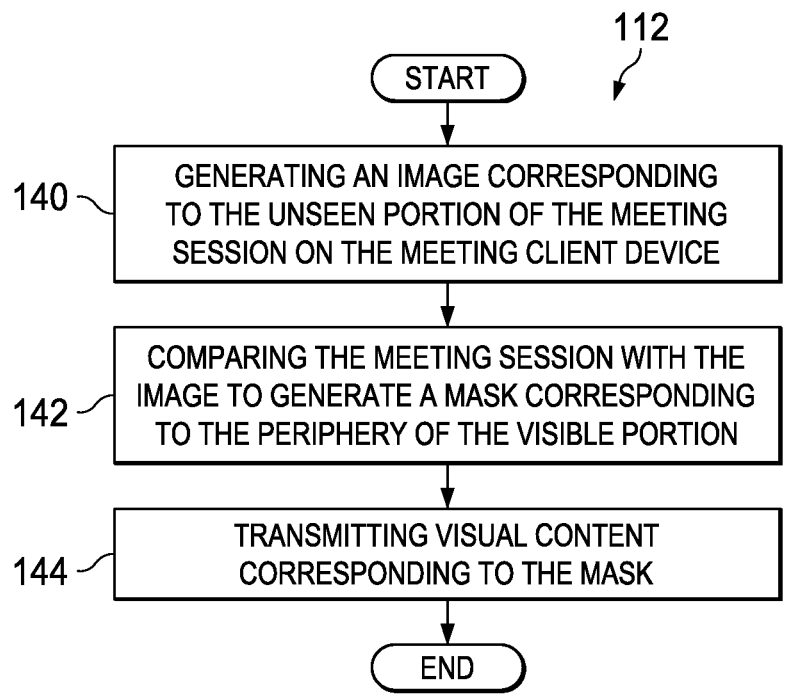
FIG. 5 is a flowchart illustrating additional details associated with an operation provided in FIG. 2.

FIG. 5 is a flowchart illustrating another set of example activities relating to operation 112 provided in FIG. 2. In 140, the system can generate an image corresponding to the unseen portion of the meeting session on the meeting client device. In 142, the system can compare the meeting session with the image to generate a mask corresponding to the periphery of the visible portion. In 144, the system transmits visual content corresponding to the mask.

FIG. 6 is a simplified schematic diagram illustrating possible details related to an example infrastructure of a communication system 10 in accordance with at least one example embodiment. Each of endpoints 12*a-e* are provisioned with a respective meeting resource module 82*a-e*, a respective processor 84*a-e*, a respective memory element 86*a-e*, a respective WebEx module 90*a-e*, a respective Meeting Place module 92*a-e*, and a respective network interface 88*a-e*, which includes a respective receiving module and a respective transmitting module for exchanging data (e.g., for exchanging packets in a network environment). FIG. 9 illustrates an example implementation of MCSs/MCC 44 that is similarly provisioned with a meeting resource module 82*f*, a processor 84*f*, and a memory element 86*f*.

In at least one example embodiment, each endpoint 12*a-e* and/or MCSs/MCC 44 includes software (e.g., as part of meeting resource modules 82*a-f*) to achieve or to support managing resources, as outlined herein in this document. In other embodiments, this feature may be provided externally to any of the aforementioned elements, or included in some other network element to achieve this functionality. Alternatively, several elements may include software (or reciprocating software) that may coordinate in order to achieve the operations, as outlined herein. In still other embodiments, any of the devices of the FIGURES may include any suitable algorithms, hardware, software, components, modules, interfaces, or objects that facilitate in managing resources.

It is imperative to note that FIG. 6 is indicative of just one, of the multitude, of example implementations of communication system 10. Any of the modules or elements within endpoints 12*a-e* and/or MCSs/MCC 44 may readily be replaced, substituted, or eliminated based on particular needs. Furthermore, although described with reference to particular scenarios, where a given module (e.g., WebEx module 90*a-e*, Meeting Place module 92*a-e*, meeting resource module 82*a-e*, etc.) is provided within endpoints 12*a-e* or MCSs/MCC 44, any one or more of these elements may be provided externally, or consolidated and/or combined in any suitable fashion. In certain instances, certain elements may be provided in a single proprietary module, device, unit, etc. in order to achieve the teachings of the present disclosure.

Endpoints 12*a-e* are representative of any type of client or user wishing to participate in a meeting session in communication system 10 (e.g., or in any other online platform). Furthermore, endpoints 12*a-e* may be associated with individuals, clients, customers, or end users wishing to participate in a meeting session in communication system 10 via some network. The term 'client device' is inclusive of devices used to initiate a communication, such as a computer, a personal digital assistant (PDA), a laptop or electronic notebook, a cellular telephone of any kind, an iPhone™, an IP phone, a Blackberry, a Google Droid™, an iPad™, a tablet, an Ultrabook™, a Microsoft Surface™, or any other device, component, element, or object capable of initiating voice, audio, video, media, or data exchanges within communication system 10. Endpoints 12*a-e* may also be inclusive of a suitable interface to the human user, such as a microphone, a display, or a keyboard or other terminal equipment. Endpoints 12*a-e* may also be any device that seeks to initiate a communication on behalf of another entity or element, such as a program, a proprietary conferencing device, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

MCSs/MCC 44 and web servers 32 are network elements that manage (or that cooperate with each other in order to manage) aspects of a meeting session. As used herein in this Specification, the term 'network element' is meant to encompass any type of servers (e.g., a video server, a web server, etc.), routers, switches, gateways, bridges, load balancers, firewalls, inline service nodes, proxies, network appliances, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. In one particular example, MCSs/MCC 44 and web servers 32 are servers that may interact with each other via the networks of FIG. 1.

Intranet 20, PSTN 22, and Internet 24 represent a series of points or nodes of interconnected communication paths for receiving and transmitting packets of information that propagate through communication system 10. These networks may offer connectivity to any of the devices or endpoints of FIG. 1. Moreover, Intranet 20, PSTN 22, and Internet 24 offer a communicative interface between sites (and/or participants, rooms, etc.) and may be any local area network (LAN), wireless LAN (WLAN), metropolitan area network (MAN), wide area network (WAN), extranet, Intranet, virtual private network (VPN), virtual LAN (VLAN), or any other appropriate architecture or system that facilitates communications in a network environment.

Intranet 20, PSTN 22, and Internet 24 may support a transmission control protocol (TCP)/IP, or a user datagram protocol (UDP)/IP in particular embodiments of the present disclosure; however, Intranet 20, PSTN 22, and Internet 24 may alternatively implement any other suitable communication protocol for transmitting and receiving data packets within communication system 10. Note also that Intranet 20, PSTN 22, and Internet 24 may accommodate any number of ancillary activities, which may accompany a meeting session. This network connectivity may facilitate all informational exchanges (e.g., notes, virtual whiteboards, PowerPoint presentations, e-mailing, word-processing applications, etc.). Along similar reasoning, Intranet 20, PSTN 22, and Internet 24 may foster all such communications and, further, be replaced by any suitable network components for facilitating the propagation of data between participants in a conferencing session.

It should also be noted that endpoints 12*a-e* and MCSs/MCC 44 may share (or coordinate) certain processing operations. Using a similar rationale, their respective memory elements may store, maintain, and/or update data in any number of possible manners. Additionally, any of the illustrated memory elements or processors may be removed, or otherwise consolidated such that a single processor and a single memory location is responsible for certain activities associated with managing resources. In a general sense, the arrangement depicted in FIG. 6 may be more logical in its representations, whereas a physical architecture may include various permutations/combinations/hybrids of these elements.

Note that in certain example embodiments, the resource management functions outlined herein may be implemented by logic encoded in one or more non-transitory tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 6) may store data used for the operations described herein. This includes the memory element being able to store software, logic, code, or processor instructions that may be executed to carry out the activities described in this Specification. A processor may execute any type of instructions associated with the data to achieve the operations detailed herein in this Specification. In one example, the processor (as shown in FIG. 6) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, meeting resource modules 82*a-f* include software in order to achieve the resource management functions outlined herein. These activities may be facilitated by MCSs/MCC 44 and/or the various endpoints 12a-f. MCSs/MCC 44 and/or endpoints 12a-f may include memory elements for storing information to be used in managing resources, as outlined herein. Additionally, MCSs/MCC 44 and/or endpoints 12a-f may include a processor that may execute software or an algorithm to perform management of resources, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

It is also important to note that the steps discussed with reference to FIGS. 1-6 illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in WebEx and Meeting Place conferencing environments or arrangements, the present disclosure may be used in any online environment that could benefit from such technology. For example, in certain instances, computers that are coupled to each other in some fashion may utilize the teachings of the present disclosure (e.g., even though participants would be in a face-to-face arrangement). As an alternative, the present disclosure may be used in collaborative resource sharing applications using video. For example, for a video sharing site, when the viewer does not see the video or only a portion of the video stream is visible, the hidden video window content does not need to be transferred.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
    monitoring a display status associated with a client device that is participating, using a meeting client program, in a meeting being conducted over a network, wherein the monitoring comprises:
    generating an image corresponding to a first portion of a meeting client program that is not visually rendered on the client device, and
    generating, using the image, a mask corresponding to a periphery of a second portion of the meeting client program that is visually rendered on the client device;
    reporting the display status to a server associated with the meeting; and
    receiving reduced meeting resources based, at least in part, on the display status, wherein the reduced meeting resources comprise visual content corresponding to the second portion of the meeting client program that is visually rendered on the client device, the visual content excluding the first portion of the meeting client program that is not visually rendered on the client device.

2. The method of claim 1, wherein if the display status is below a predetermined threshold, the visual content is not provided to the client device.

3. The method of claim 1, wherein the reduced meeting resources comprise video data.

4. The method of claim 1, wherein the reduced meeting resources comprise audio data.

5. The method of claim 1, wherein the reduced meeting resources comprise shared data provided during the meeting.

6. The method of claim 1, further comprising:
    identifying a window associated with the meeting client program being at least partially covered by another window, wherein the identifying generates the reduced meeting resources by triggering a reduction in meeting resources for the client device.

7. The method of claim 1, further comprising:
    identifying particular regions of a display screen of the client device, wherein the identifying generates the reduced meeting resources by triggering a reduction in meeting resources for the client device.

8. The method of claim 1, further comprising:
    identifying inactivity status associated with the client device.

9. The method of claim 1, further comprising:
    entering into an inactive mode in which a connection for the meeting is kept alive, wherein the client device does not receive video data or audio data while in the inactive mode.

10. The method of claim 1, further comprising:
    identifying inactivity by the client device in order to provide lower-frame-rate video to the client device.

11. The method of claim 1, wherein video data is progressively degraded based, at least in part, on the display status.

12. A non-transitory computer readable media comprising instructions that, when executed, cause an apparatus to:
    monitor a display status associated with a client device that is participating, using a meeting client program, in a meeting being conducted over a network, wherein the monitoring comprises causing the apparatus to:
    generate an image corresponding to a first portion of a meeting client program that is not visually rendered on the client device, and
    generate, using the image, a mask corresponding to a periphery of a second portion of the meeting client program that is visually rendered on the client device;
    report the display status to a server associated with the meeting; and
    receive reduced meeting resources based, at least in part, on the display status, wherein the reduced meeting resources comprise visual content corresponding to the second portion of the meeting client program that is visually rendered on the client device, the visual content excluding the first portion of the meeting client program that is not visually rendered on the client device.

13. The non-transitory computer readable media of claim 12, wherein if the display status is below a predetermined threshold, the visual content is not provided to the client device.

14. The non-transitory computer readable media of claim 12, wherein the reduced meeting resources include a selected one of a group of resources, the group consisting of:
  a) video data;
  b) audio data; and
  c) shared data provided during the meeting.

15. The non-transitory computer readable media of claim 12, wherein the instructions, when executed, further cause the apparatus to:
  identify a window associated with the meeting client program being at least partially covered by another window, wherein the identifying generates the reduced meeting resources by triggering a reduction in meeting resources for the client device.

16. A server, comprising:
  a memory including code for execution; and
  a processor, wherein when the processor executes the code and configures a meeting resource module to perform operations comprising:
    receiving a display status associated with a client device that is participating, using a meeting client program, in a meeting being conducted over a network; and
    providing reduced meeting resources based, at least in part, on the display status, wherein the providing the reduced meeting resources comprises:
      generating an image corresponding to a first portion of the meeting client program that is not visually rendered on the client device,
      generating, using the image, a mask corresponding to a periphery of a second portion of the meeting client program that is visually rendered on the client device, and
      transmitting visual content corresponding to the mask, wherein the visual content comprises the second portion of the meeting client program that is visually rendered on the client device and excludes the first portion of the meeting client program that is not visually rendered on the client device.

17. The server of claim 16, wherein the operations further comprise:
  generating an additional image corresponding to the second portion of the meeting client program that is visually rendered on the client device; and
  generating, using the additional image, another mask corresponding to the periphery of the second portion of the meeting client program that is visually rendered on the client device.

18. The non-transitory computer readable media of claim 12, wherein the instructions, when executed, further cause the apparatus to:
  identify inactivity by the client device in order to provide lower-frame-rate video to the client device.

19. The server of claim 16, wherein if the display status is below a predetermined threshold, the visual content is not provided to the client device.

20. The server of claim 16, wherein the reduced meeting resources include a selected one of a group of resources, the group consisting of:
  a) video data;
  b) audio data; and
  c) shared data provided during the meeting.

* * * * *